Patented May 20, 1952

2,597,614

UNITED STATES PATENT OFFICE 2,597,614

METHOD OF RENDERING ORGANIC TEXTILE MATERIAL WATER REPELLENT AND COMPOSITION THEREFOR

Alfred E. Brown and Arnold M. Sookne, Washington, D. C., and Francis W. Minor, Arlington, Va., assignors, by mesne assignments, to Harris Research Laboratories, a partnership No Drawing. Application February 6, 1947, Serial No. 726,950

11 Claims. (Cl. 117—121)

This invention relates to a method of improving textile materials. The process is particularly useful in treating textile fabrics to render them water-repellent and is also useful in improving the abrasion resistance, the hand, and the resiliency of such fabrics. It also relates to a composition for improving textile materials and to a method of making the composition.

We have found that the advantages of a silicone finish on textiles may be secured by the use of an emulsion of suitable silicone oils. The properties conferred upon textiles by the emulsions are similar to those conferred by treatments with solutions of the same oils in non-aqueous solvents, but are obtained without the disadvantages accruing from the use of organic solvents or, in contrast to the conditions during application of alkylchlorosilanes to textiles, the disadvantages of high acidity. For the production of water repellency in fabrics, we prefer to use emulsions of the oil obtained by controlled hydrolysis of alkyldichlorosilanes, such as mono- and di-methyl and mono- and di-ethyl, particularly monomethyldichlorosilane. Advantages other than the production of water repellency which are brought about in fabrics by the treatment of the invention are improvement in hand and resiliency and improvement in the resistance to abrasion.

The treatment consists essentially in treating the fabric with an emulsion of silicone oil in water, preferably followed by drying and curing at elevated temperatures. In many cases it is desirable to introduce additional steps comprising washing to remove emulsifying agent and neutralizing agents from the treated fabric. The emulsions tend to exhaust on the fabric.

The emulsions may be conveniently prepared from the alkylchlorosilanes, provided precautions are taken to avoid the formation of highly polymerized silicone, or may be prepared from silicone oils derived from them. A number of methods have been described for the preparation of oily hydrolysis products of alkylchlorosilanes (for example, see F. J. Norton, U. S. Patent 2,386,259; Murray M. Sprung, U. S. Patent 2,383,827; and Rob Roy McGregor, U. S. Patent 2,375,998). We have prepared emulsions of the oily hydrolysis product mentioned by Norton, and have found such emulsions to be suitable for treatment of textiles. We prefer however to prepare the emulsions by a more direct process which omits some of the steps employed in this preparation. In the preferred process, an emulsion is prepared by adding a solution of mono-methyldichlorosilane in a suitable solvent to water and emulsifier, and if desired a neutralizing agent. Alternatively, the emulsifier may be added to the solution of alkylchlorosilane before hydrolysis of the latter. The quantity of emulsifier used need not be large, successful emulsification having been obtained with quantities as little as 0.01% of the weight of the oil, but larger amounts of emulsifier of the order of 5% may be used as required. During hydrolysis, it is necessary that the monomethyldichlorosilane be somewhat diluted, as is the practice in the methods referred to above for the preparation of silicone oil, since a sufficient dilution prevents the formation of highly polymerized silicone, which otherwise occurs. We have found that in addition to the inert solvents typified in the literature by toluene, a chemically very active substance such as dimethyldichlorosilane may be employed as diluent. The proportion of diluent to mono-methyldichlorosilane should be greater than 1:2 to delay polymerization for a reasonable length of time. When benzene is used as diluent, a mixture containing 4 volumes of monomethyldichlorosilane and 5 volumes of benzene may advantageously be employed. The proportion of diluent desirable can be reduced to some extent by utilizing in addition other means of retarding polymerization, such as by maintaining a low temperature during hydrolysis, and low acidity after hydrolysis. The maintenance of a low temperature by cooling the reaction mixture during hydrolysis is desirable also for the reason that it tends to prevent losses of the methyldichlorosilane by evaporation. Low acidity of the hydrolysate may be achieved by either extracting the acid from the hydrolysate with water or by neutralizing it. The rate of addition of the mono-methyldichlorosilane may be as rapid as is consistent with satisfactory absorption of the hydrochloric acid by the water. It has been observed that if the rate of admixture is too rapid, there is an appreciable evolution of hydrogen chloride gas, which may carry with it vapors of the mono-methyldichlorosilane.

The quantity of water employed during hydrolysis preferably is at least equal to twice the volume of the mono-methyldichlorosilane solution, but 100 times the volume of the mono-methyldichlorosilane solution may be used. The volume of water used may be as great as is necessary to avoid dilution of the emulsion subsequently and prior to its application to a textile. The minimum quantity of water recommended effectively avoids the formation of water in oil emulsion which is undesirable and which may be obtained if the proportion of water employed is too low. The degree of dispersion of the silicone or silicone solution in the water may be improved by passing the emulsion through a homogenizer or colloid mill. Application of the above principles is illustrated in the methods of preparation described in the following examples of treatments of textiles with silicone emulsions.

*Example 1*

An emulsion of silicone oil is prepared by mixing a solution of mono-methyldichlorosilane in benzene with water containing sodium acetate and an emulsifying agent comprising sodium stearyl taurine, $C_{17}H_{33}CONHC_2H_4SO_3Na$, 33% active ingredient and 67% diluent, in the following proportions:

2 ml. of a solution containing 4 vols. (⅘ ml.) of $CH_3HSiCl_2$ and 5 vols. (1⅛ ml.) of benzene.
16 ml. of water
0.01 g. of emulsifying agent
5.5 g. of sodium acetate trihydrate The solution of mono-methyldichlorosilane in benzene is added slowly with stirring to the mixture of water, sodium acetate and emulsifying agent. An emulsion is readily formed, which is dispersed further by passage through a homogenizer. The homogenized mixture is diluted to 100 ml. with water and used to treat a 10-gram swatch of 18-oz. serge, dyed olive drab. The serge is agitated in the emulsion for five minutes, and thereafter removed, dried at a temperature of 100° C., washed to remove the sodium acetate and emulsifying agent, and finally dried and cured for two hours at 100° C.

As a result of the treatments, a soft hand and excellent water repellency is produced in the fabric.

*Example 2*

Six ml. of the oily hydrolysis product obtained from mono-methyldichlorosilane according to the method described by Norton (U. S. Patent 2,386,259, October 9, 1945) is emulsified in 600 ml. of water. To facilitate emulsification, 0.06 g. of sorbitan monostearate and 0.06 g. of a polyoxyalkalene derivative of sorbitan monostearate is added to and dispersed in the 6 ml. of oil. The mixture of silicone oil and emulsifying agents readily emulsifies when stirred with the water. Rayon hose are immersed in a volume of emulsion equal to approximately 20 times their weight, and are agitated therein for five minutes, after which they are removed, passed through squeeze rolls to remove an excess of emulsion, and dried and cured by holding them in an oven for four hours at 105° C.

The treated hose have a softer smoother feel, and are more extensible or stretchy than the untreated hose, and during wear show less tendency to become baggy and to turn at the heel than do the untreated hose. Tests of the extensibility under constant load show that the treated hose stretches 20% more than the untreated hose.

*Example 3*

An emulsion is prepared from 2 ml. of the oily hydrolysis product from mono-methyldichlorosilane by stirring it into 5 ml. of water containing 1 percent of sorbitan monostearate and 1 percent of a polyoxyalkalene derivative of sorbitan monostearate. The emulsion so obtained is diluted to 500 ml. with water, and used to treat nylon hose.

Two pair of nylon hose are immersed in the emulsion and treated thereafter in the manner described in Example 2 for the treatment of rayon hose. As a result of the treatment, the hose are made water repellent and noticeably more extensible. The treated hose have a soft smooth hand.

*Example 4*

Two ml. of a solution of three parts of dimethyldichlorosilane and four parts of monomethyldichlorosilane is added slowly with stirring to a slurry formed from 10 grams of sodium acetate trihydrate, 1 ml. of 10% aqueous solution of the taurine emulsifying agent mentioned in Example 1 and 9 g. of ice. The emulsion thus formed is diluted to 100 ml. with water.

A strip of poplin 8″ wide by 36″ long and weighing approximately 40 grams is immersed in the diluted emulsion for 5 minutes. The emulsion is exhausted by the fabric. The fabric is thereafter removed from the emulsion, dried at room temperature, washed in 3 changes of water, and finally dried and cured by holding it in an oven at 110° C. for two hours. It is given a softer hand and is made water repellent by the treatment.

*Example 5*

Viscose fabric is treated with a dilute emulsion of silicone oil prepared according to the method described in Example 1. The fabric is treated with the emulsion substantially according to the method described in Example 1. As a result of the treatment, a softer hand and appreciable water repellency are conferred upon the fabric.

*Example 6*

A fabric containing 50% of cellulose acetate and 50% regenerated protein fiber is treated with a dilute emulsion of silicone oil prepared according to the method described in Example 1. The method of treatment was substantially the same as that described in Example 1. The treated fabric has a soft smooth hand, and is quite water repellent. When drops of water are placed on the treated fabric, it does not pucker, while the untreated fabric puckers badly.

*Example 7*

An emulsion may be prepared from the solution of silicone in benzene obtained by controlled hydrolysis of methyldichlorosilane. The hydrolysis may be accomplished by slowly adding 2 ml. of a solution comprising 4 volumes (⅘ ml.) of methyldichlorosilane and 5 volumes (1⅛ ml.) of benzene to a saturated solution of 5.5 gr. sodium acetate trihydrate held at 0–10° C. On completion of the hydrolysis, as indicated by a test of the acidity of the supernatant oily solution, the aqueous phase is withdrawn and discarded. The oily solution may then be emulsified by stirring into 100 ml. of an aqueous solution of 0.01 to 5% of the emulsifying agent of Example 1 based on the weight of the oil. The emulsion so prepared when applied to serge fabric confers a soft feel and appreciable water repellency.

The emulsion prepared in accordance with this example may be used in the treatments described in Examples 2–6.

Although emulsions of fairly high oil concentration can be prepared, such emulsions are preferably diluted for application to textile materials. The diluted emulsions preferably have a silicone oil concentration of from 0.25% to 3.0% of the weight of the water.

From the foregoing description it will be seen that the present invention provides a relatively simple process for improving the properties of textile materials such as textile fabrics and the like. It also provides an improved composition for such purposes and a method of making the composition.

We claim:

1. The method of preparing an organic-textile treating composition which comprises adding about 2 ml. of a solution containing about 4 vols. of mono-methyldichlorosilane and about 5 vols. of benzene to a solution composed of about 16 ml. of water, 5.5 g. of sodium acetate trihydrate and 0.01 g. of sodium stearyl taurine, agitating the mixture to form an emulsion, and thereafter diluting the emulsion to about 100 ml. with water.

2. The method of preparing an organic textile treating composition which comprises adding a solution containing a mono-alkyl dichlorosilane and an inert organic solvent selected from the group consisting of benzene and methyl benzene in the proportion of at least 1 part by volume of said inert aromatic solvent to 2 parts of mono-alkyl dichlorosilane to a water solution of sodium acetate, the proportion of water to mono-alkyl dichlorosilane solution being at least equal to twice the volume of said mono-alkyl dichlorosilane solution, and said sodium acetate being present in an amount at least sufficient to neutralize hydrochloric acid evolved in the hydrolysis of said mono-alkyl dichlorosilane, and agitating the mixture in the presence of an emulsifying agent, said emulsifying agent being present in the proportion of from 0.01 to about 5% by weight of the hydrolysis product of said mono-alkyl dichlorosilane, whereby an emulsion is formed.

3. The method of preparing an organic textile treating composition which comprises adding a solution containing a mono-alkyl dichlorosilane and an inert organic solvent selected from the group consisting of benzene and methyl benzene in the proportion of at least 1 part by volume of said inert aromatic solvent to 2 parts of mono-alkyl dichlorosilane to a water solution of sodium acetate and an emulsifying agent, the proportion of water to mono-alkyl dichlorosilane solution being at least equal to twice the volume of said mono-alkyl dichlorosilane solution, and said sodium acetate being present in an amount at least sufficient to neutralize hydrochloric acid evolved in the hydrolysis of said monoalkyl dichlorosilane, and agitating the mixture to form an emulsion of the hydrolyzate formed in situ of said monoalkyl dichlorosilane, the proportion of emulsifying agent being from 0.01 to about 5% by weight of said hydrolyzate.

4. The method of preparing an organic textile treating composition which comprises adding a solution containing a mono-alkyl dichlorosilane and an inert organic solvent selected from the group consisting of benzene and methyl benzene in the proportion of at least 1 part by volume of said inert aromatic solvent to 2 parts of mono-alkyl dichlorosilane to a water solution of sodium acetate, the proportion of water to mono-alkyl dichlorosilane solution being at least equal to twice the volume of said mono-alkyl dichlorosilane solution, and said sodium acetate being present in an amount at least sufficient to neutralize hydrochloric acid evolved in the hydrolysis of said monoalkyl dichlorsilane, whereby said monoalkyl dichlorosilane is slowly hydrolyzed, separating the aqueous phase formed during the hydrolysis, and emulsifying the remainder in the presence of an emulsifying agent in the proportion of 0.01 to about 5% by weight of the hydrolyzate.

5. The method of preparing an organic textile treating composition which comprises adding a solution containing about ⅝ ml. of the monomethyl dichlorosilane and an inert organic solvent being a member of the group consisting of benzene and methyl benzene, said innert organic solvent being present in the proportion of at least 1 part by volume to 2 parts by volume of monomethyl dichlorosilane, to a solution containing about 5.5 grams of sodium acetate trihydrate and at least enough water to dissolve said sodium acetate trihydrate, and agitating the mixture in the presence of an emulsifying agent, said emulsifying agent being present in the proportion of from 0.01 to about 5% by weight of the hydrolyzate of said mono-methyl dichlorosilane, whereby an emulsion is formed.

6. The method of preparing an organic textile treating composition comprising adding about 2 ml. of a solution containing about 4 vols. of monomethyl dichlorosilane and about 5 vols. of benzene to a saturated water solution of 5.5 g. of sodium acetate trihydrate, hydrolyzing said solution, separating the aqueous phase formed during the hydrolysis, adding the remainder to about 100 ml. of an aqueous solution of from 0.01 to 5% of sodium stearyl taurine, and agitating the last-named mixture to form an emulsion.

7. An organic textile treating composition comprising a water emulsion of the polymerized hydrolysis product of a mono-alkyl dichlorosilane, and an inert organic solvent being a member of the group consisting of benzene and methyl benzene, said inert organic solvent being present in the proportion of at least 1 part by volume to 2 parts mono-alkyl dichlorosilane, an emulsifying agent in an amonut of from 0.01 to 5% to said polymerized hydrolysis product, and sodium acetate, and said sodium acetate being present in an amount at least sufficient to neutralize hydrochloric acid evolved in the hydrolysis of said monoalkyl dichlorosilane, the concentration of said polymerized hydrolysis product being from 0.25 to 3% of the weight of the water.

8. An organic textile treating composition comprising a water emulsion of the polymerized hydrolysis product of about ⅝ ml. of mono-methyl dichlorosilane, about 1⅛ ml. benzene, from 0.01 to 5% sodium stearyl taurine, and about 5.5 g. sodium acetate trihydrate, the concentration of said polymerized hydrolysis product being from 0.25 to 3% of the weight of the water.

9. An organic textile treating composition comprising a water emulsion of the polymerized hydrolysis product of about ⅝ ml. of mono-methyl dichlorosilane, about 1⅛ ml. benzene, from 0.01 to about 5% sodium stearyl taurine, and about 5.5 g. sodium acetate trihydrate, per 100 ml. of water.

10. A method of rendering an organic textile material water repellent which comprises treating said material with a diluted emulsion prepared in accordance with claim 2, said emulsion having a silicone oil concentration from 0.25% to 3% by weight, drying the treated material, washing the dried material to remove the alkaline substance and emulsifying agent contained in said emulsion, and again drying and heat-curing said treated material.

11. A method of rendering an organic textile material water repellent, which comprises treating said material with an emulsion according to claim 7, drying the treated material, washing the dried material to remove sodium acetate and emulsifying agent contained in said emulsion, and again drying and heat-curing said treated material at a temperature of at least 100° C. for at least 30 minutes.

ALFRED E. BROWN.
ARNOLD M. SOOKNE.
FRANCIS W. MINOR.

REFERENCES CITED

The following references are of record in the file of this patent:

UNITED STATES PATENTS

| Number | Name | Date |
|---|---|---|
| 2,386,259 | Norton | Oct. 9, 1945 |
| 2,390,370 | Hyde | Dec. 4, 1945 |
| 2,392,805 | Biefeld | Jan. 15, 1946 |
| 2,439,689 | Hyde | Apr. 13, 1948 |
| 2,482,307 | Walker et al. | Sept. 20, 1949 |

FOREIGN PATENTS

| Number | Country | Date |
|---|---|---|
| 574,003 | Great Britain | Dec. 17, 1945 |

OTHER REFERENCES

Stock: Hydrides of Boron and Silicon, Cornell University Press (page 28) 1933.